(12) United States Patent
Anderson et al.

(10) Patent No.: US 11,808,442 B1
(45) Date of Patent: Nov. 7, 2023

(54) SYSTEMS AND METHODS FOR WIRELESS TRANSMISSION OF ELECTRICITY FOR SPA ILLUMINATION

(71) Applicant: BULLFROG INTERNATIONAL, LC, Herriman, UT (US)

(72) Inventors: Todd Anderson, Lehi, UT (US); Eric Hales, Eagle Mountain, UT (US); Michael Andersen, American Fork, UT (US)

(73) Assignee: Bullfrog International, LC, Herriman, UT (US)

( * ) Notice: Subject to any disclaimer, the term of this patent is extended or adjusted under 35 U.S.C. 154(b) by 0 days.

(21) Appl. No.: 17/984,872

(22) Filed: Nov. 10, 2022

(51) Int. Cl.
 - *F21W 131/401* (2006.01)
 - *F21V 23/02* (2006.01)
 - *H02J 50/10* (2016.01)

(52) U.S. Cl.
 CPC ............ *F21V 23/023* (2013.01); *H02J 50/10* (2016.02); *F21W 2131/401* (2013.01)

(58) Field of Classification Search
 CPC ......... F21V 23/023; H02J 50/10; A47C 7/021
 See application file for complete search history.

(56) References Cited

U.S. PATENT DOCUMENTS

| | | | | |
|---|---|---|---|---|
| 4,844,333 A | * | 7/1989 | Davis ................. | G05D 23/1925 236/94 |
| 9,097,234 B2 | * | 8/2015 | Breau ..................... | F03B 13/10 |
| 9,887,588 B2 | | 2/2018 | Dai | |
| 10,681,793 B1 | * | 6/2020 | Sanson .................. | H05B 45/20 |
| 10,938,245 B1 | * | 3/2021 | Sanson ................... | F21V 23/06 |
| 2006/0096020 A1 | * | 5/2006 | Caudilo ............... | A61H 33/005 4/541.1 |
| 2008/0223788 A1 | * | 9/2008 | Rimdzius .................. | C02F 9/00 202/176 |
| 2015/0267883 A1 | * | 9/2015 | Hillyard .................. | F21S 8/024 362/249.02 |
| 2022/0351608 A1 | * | 11/2022 | Macey .................... | H04W 4/80 |
| 2023/0015680 A1 | * | 1/2023 | Crist .................. | H02J 7/00032 |

FOREIGN PATENT DOCUMENTS

| CA | 2524556 | * | 5/2006 | ............. A61H 33/60 |
|---|---|---|---|---|
| CN | WO 2020/152615 | * | 7/2020 | ........... H05B 47/195 |

\* cited by examiner

*Primary Examiner* — Zheng Song
(74) *Attorney, Agent, or Firm* — Dentons Durham Jones Pinegar; Sarah W. Matthews; Lilly Godfrey

(57) ABSTRACT

This disclosure relates generally to induction systems for wirelessly transmitting electricity. Specifically, embodiments of the present disclosure relate to methods and systems for wirelessly transmitting electricity to a light incorporated within, for example, a spa. In some embodiments, the systems include at least one pair of induction coils (e.g., receiving and transmitting coils) incorporated into a selectively removable spa seatback. The at least one pair of induction coils can be used to wirelessly transmit electricity to a light disposed within the selectively removable spa seatback. In some embodiments, a converter is incorporated into the system to adjust at least one characteristic of the light, such as brightness, color, and/or a lighting pattern.

14 Claims, 11 Drawing Sheets

SYSTEMS AND METHODS FOR WIRELESS TRANSMISSION OF ELECTRICITY FOR SPA ILLUMINATION

TECHNICAL FIELD

This disclosure relates generally to the wireless transmission of electricity. More specifically, this disclosure relates to providing wireless electricity to spa lighting applications.

SUMMARY

In various aspects, systems and methods are provided for the wireless transmission of electricity. Specifically, systems and methods of the present disclosure are provided for the wireless transmission of electricity to various spa accessories. For example, in some embodiments, a method of wirelessly transmitting electricity to a light includes installing a transmitting device in connection with a spa shell. For example, the transmitting device can be installed on top of the spa shell, just under a top surface of the spa shell, and/or within a cavity or port defined by a portion of the spa shell. The method can additionally include installing a receiving device within a selectively removable spa seatback, where the receiving device is in electrical communication with the light. Similar to the transmitting device, the receiving device can be installed in connection with the spa shell. The method can further include transmitting, by the transmitting device, an induction signal and receiving, by the receiving device, the induction signal. The received induction signal can then be used to power the light.

Systems for wirelessly transmitting electricity to a light in, for example, a selectively removable spa seatback are also disclosed. In some embodiments, a system for wirelessly transmitting electricity to a light can include a selectively removable spa seatback and a transmitting device in connection with a spa shell. The transmitting device can be installed on top of the spa shell, just under a top surface of the spa shell, and/or within a cavity or port defined by a portion of the spa shell. The system can also include a receiving device housed within the selectively removable spa seatback, where the receiving device is in electrical communication with the transmitting device. In some embodiments, the system can further include a light within the selectively removable spa seatback, where the light is in electrical communication with the receiving device. In some embodiments, the system also includes a converter in electrical communication with the light and a control box of a spa.

Other aspects of the disclosed subject matter, as well as features and advantages of various aspects of the disclosed subject matter, should be apparent to those of ordinary skill in the art through consideration of the ensuing description, the accompanying drawings, and the appended claims.

DETAILED DESCRIPTION

Disclosed are systems and methods for the wireless transmission of electricity. Specifically, systems and methods of the present disclosure are provided for the wireless transmission of electricity to various spa accessories. In some embodiments, the various spa accessories include lights, cup holders, candles, or other spa components.

Figure 1:
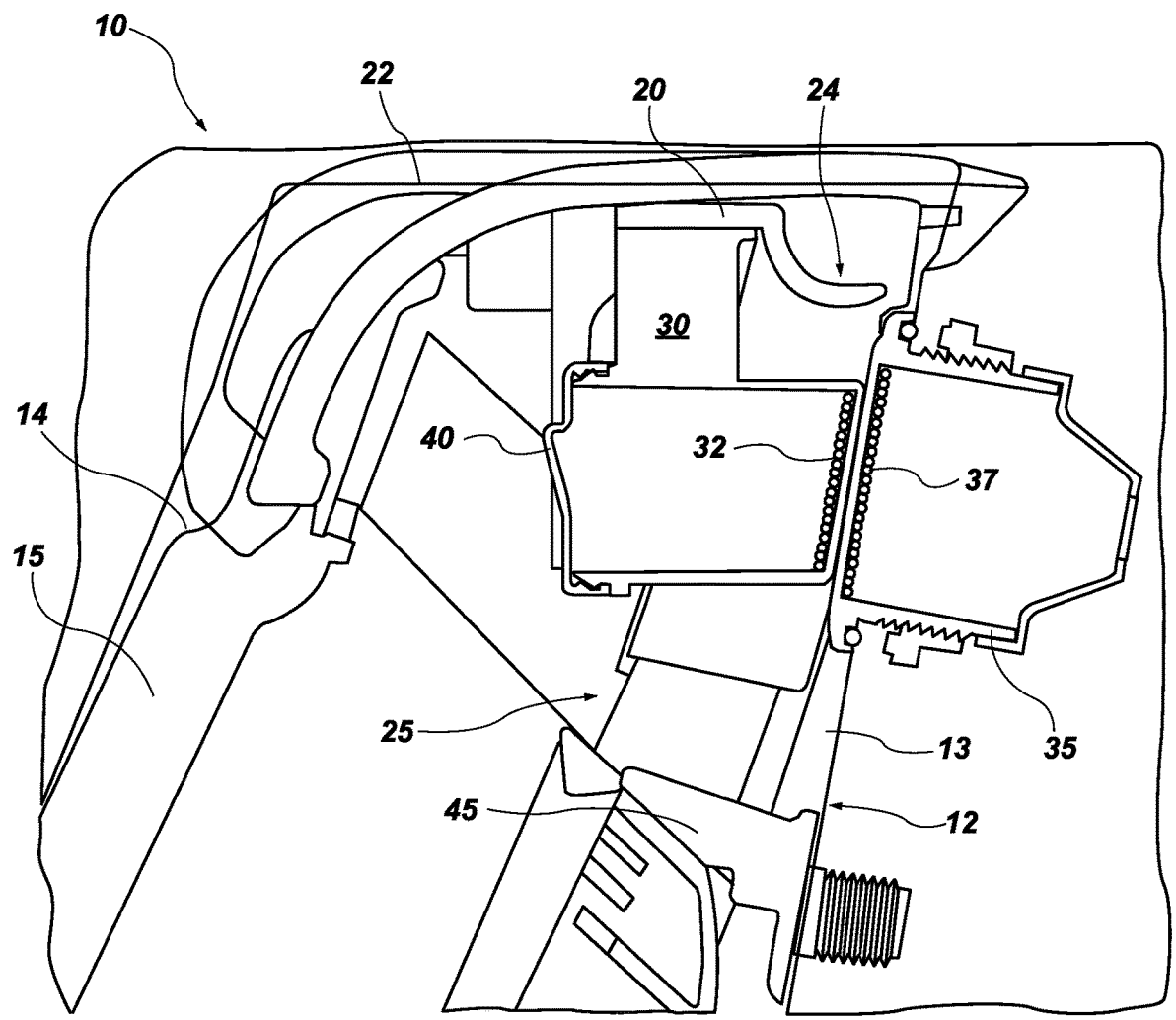
FIG. 1 provides a cross-sectional side view of an embodiment of an induction lighting system according to the present disclosure.
Figure 2:
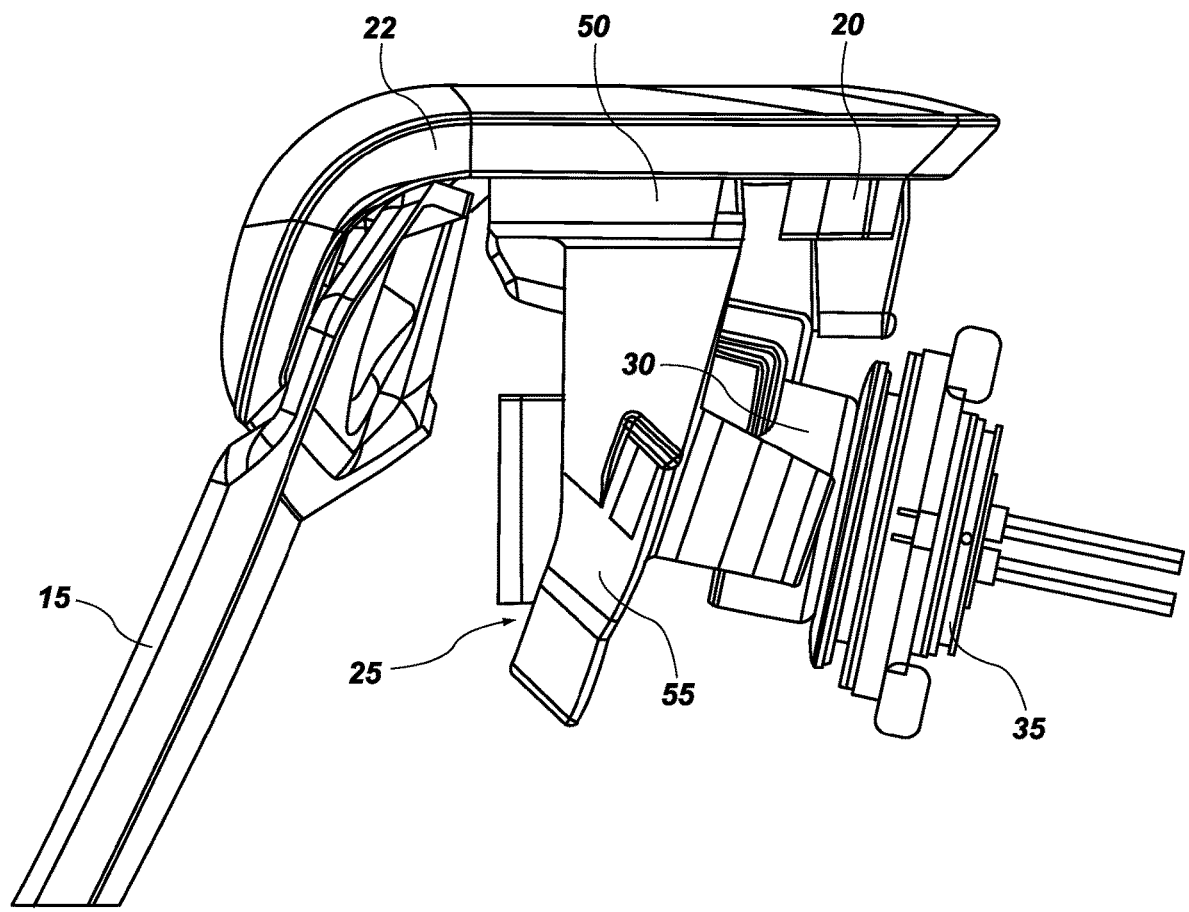
FIGS. 2 and 3 provide side views of the embodiment of the induction lighting system shown in FIG. 1.
Figure 3:
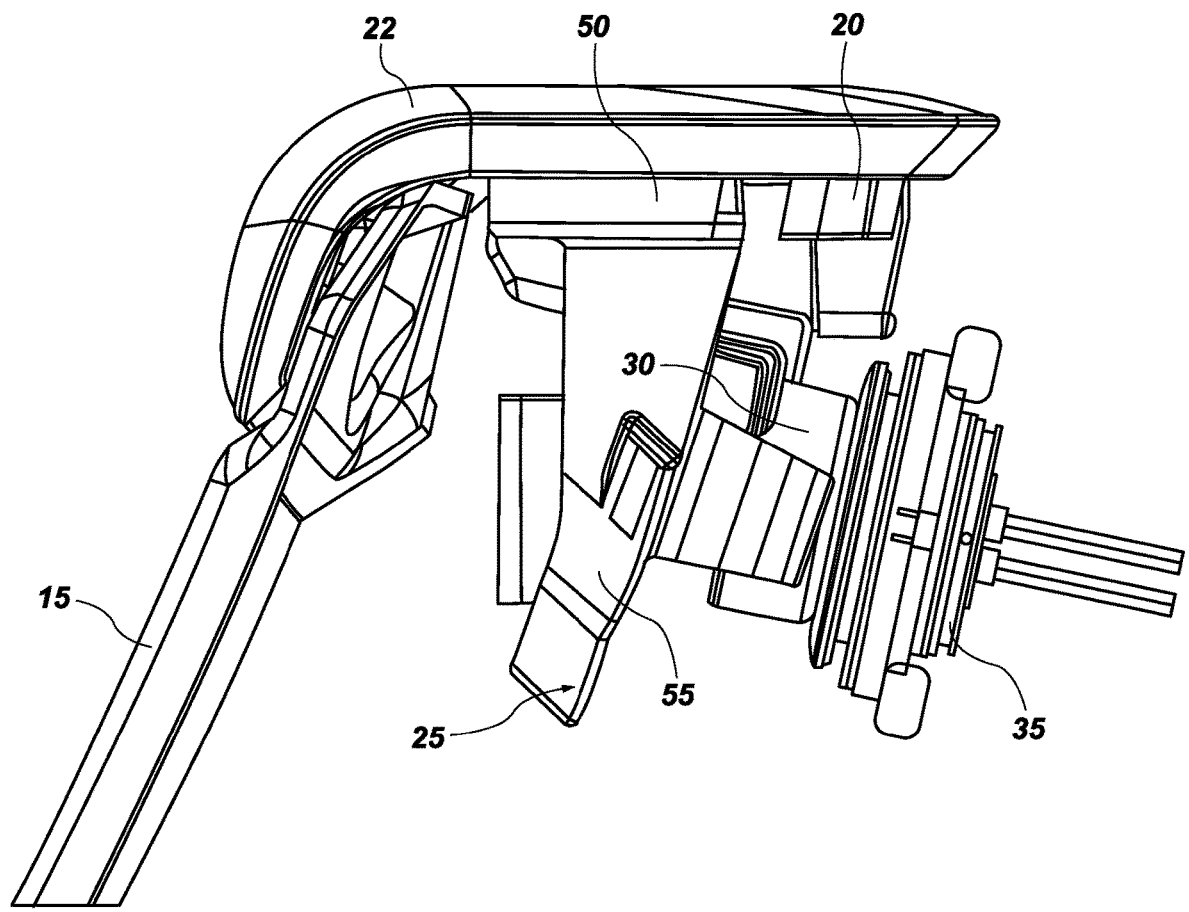

FIG. 1 provides a cross-sectional side view of an embodiment of an induction lighting system 10 according to the present disclosure. FIGS. 2 and 3 provide side views of the embodiment of the induction lighting system 10 shown in FIG. 1. As illustrated in FIGS. 1-3, the induction lighting system 10 includes a spa shell 12, a selectively removable seatback 15 with a manifold 25, a body 30 for housing induction receiving coils 32, a body 35 for housing induction transmitting coils 37, and a light 40. At least a portion of the induction lighting system 10 can be housed by the spa shell 12. In some embodiments, the system 10 can also include a nozzle 45 for providing water or other fluids to the spa and/or the selectively removable spa seatback 15.

The selectively removable seatback 15 includes a pillow or headrest 22 and a snap cap or attachment point 20. In some embodiments, the pillow 22 is connected to the snap cap 20. In some embodiments, the snap cap 20 is configured to pivot or rotate about a pivot point 24. In some embodiments, the manifold 25 (see FIG. 4) removably connects the selectively removable seatback 15 to the spa shell 12. For example, the spa shell 12 can define a hollow configured to receive the selectively removable seatback 15, and the manifold 25 can be configured to removably secure the selectively removable seatback 15 within the hollow.

In some embodiments, the spa shell 12 has an exterior surface 13 and an interior surface 14. A port extends through the spa shell 12, from the exterior surface 13 to the interior surface 14, for receiving the body 35 for housing induction transmitting coils 37. The port is positioned such that the induction transmitting coils 37 housed within the body 35 interface with the induction receiving coils 32 housed within the body 30. In some embodiments, water flows between the body 35 for housing induction transmitting coils 37 and the selectively removable seat back 15.

The spa shell 12 defines the hollow configured to receive the selectively removable seatback 15. In some embodiments, the port extends through the spa shell 12 and into a portion of the hollow. This allows the induction transmitting coils 37 housed within the body 35 to interface with the induction receiving coils 32 housed within the body 30. In other embodiments, the body 35 for housing induction transmitting coils 37 extends only partially through the spa shell 12, or the body 35 for housing induction transmitting coils 37 can be behind the spa shell 12. The selectively removable seatback 15 can be in an installed position or an uninstalled position. In the installed position, the selectively removable seatback 15 is secured within the hollow via the manifold 25. Additionally, in the installed position, the bodies 30, 35 are aligned such that the induction receiving coils 32 and the induction transmitting coils 37 are aligned and can interface with each other. This arrangement allows the induction receiving coils 32 to receive an induction signal generated and transmitted by the induction transmitting coils 37. Induction receiving coils 32 can receive an induction signal generated and transmitting by the induction transmitting coils 37 even if water flows between the bodies 30, 35.

In the uninstalled position, the selectively removable seatback 15 has been removed from the hollow and/or the spa shell 12 entirely. A second selectively removable seatback 15 can then be placed within the hollow, where the second selectively removable seatback 15 will then be in the installed position.

In some embodiments, the manifold 25 is sized and shaped to provide a body 30 for housing induction receiving coils 32. For example, the body 30 can be defined by the manifold 25. Additionally, and/or alternatively, the body 30 can be a separate housing attached to the manifold 25. In either case, the body 30 is sized, shaped, and/or otherwise configured to house the induction receiving coils 32. For example, the induction receiving coils 32 can be disposed within a cavity of the body 30. In some embodiments, the light 40 is attached to the body 30 and in electrical communication with the induction receiving coils 32. The induction receiving coils 32 are configured to receive an induction signal transmitted by the induction transmitting coils 37. The induction signal received by the receiving coils 32 can be converted to an electric current to power the light 40 and/or other spa accessories.

As discussed, the body 35 for housing the induction transmitting coils 37 can be received by an aperture or port in the spa shell 12. As illustrated, the manifold 25 positions the body 30 within the cavity of the spa shell 12 such that the body 30 (and, thus, the induction receiving coils 32) substantially abuts and aligns with the body 35 (and, thus, the induction transmitting coils 37). In other words, the manifold 25 positions the body 30 within the cavity such that the body 30 (and, thus, the induction receiving coils 32) interfaces with the body 35. By placing the bodies 30, 35 in such an arrangement, the induction receiving coils 32 can receive an induction signal generated and transmitted by the induction transmitting coils 37. In some embodiments, the induction transmitting coils 37 are connected to and in electrical communication with a control box (see FIGS. 9 and 10) for the spa. In some embodiments, an additional power supply is incorporated into the system 10 to provide adequate power (e.g., adequate amperage, watts, etc.) to the induction transmitting coils 37.

Housing both the induction receiving and transmitting coils 32, 37 within the bodies 30, 35 seals and/or protects the induction receiving and transmitting coils 32, 37 from exposure to water or other liquids. By using induction signals to power lights and/or other spa accessories, no electrical (i.e., conductive) components are exposed to water, thereby increasing the safety of the spa. That is, lights and other accessories can be powered by the disclosed induction systems without risk of electrocuting a user of the spa. Additionally, because the lights are fully integrated into the selectively removable seatbacks 15, the safety of the spa is maintained as the selectively removable seatbacks 15 are interchanged.

Figure 4:
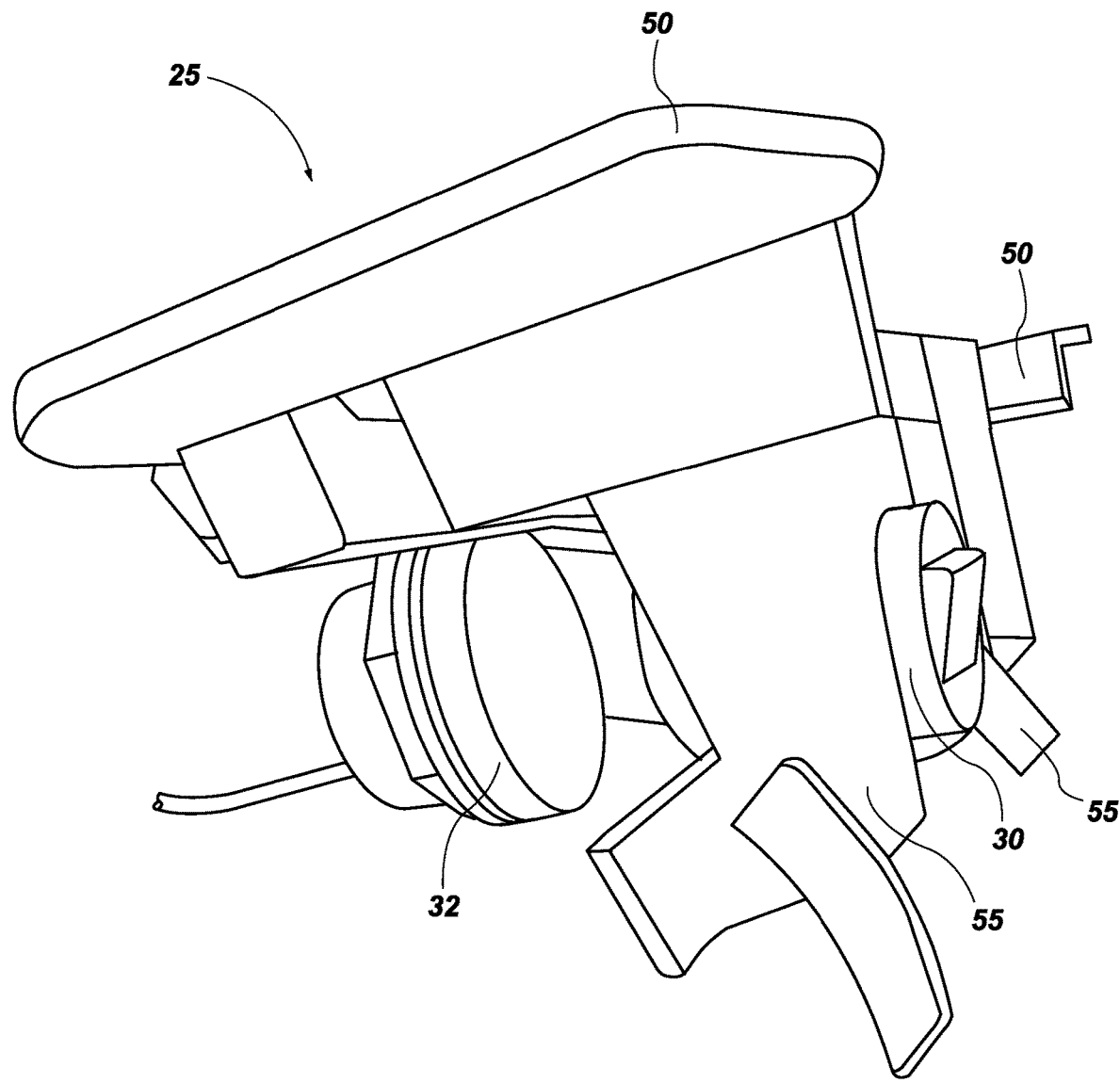
FIG. 4 provides a back, perspective view of an embodiment of a manifold used in an induction lighting system of the present disclosure.

FIG. 4 provides a front, perspective view of an embodiment of a manifold 25. For example, the manifold 25 may be incorporated into a selectively removable seatback 15, as described herein. The manifold 25 can include a pair of top support brackets 50 and a pair of bottom support brackets 55. As illustrated, the manifold 25 defines or includes the body 30 to house and receive the induction receiving coils 32. In some embodiments, the top support brackets 50 are sized and shaped to receive the pillow 22 of the selectively removable seatback 15. In some embodiments, the top support brackets 50 also interact or engage with the spa shell 12 to attach or anchor the selectively removable seatback 15 to the spa shell 12 (see FIG. 1). In some embodiments, the bottom support brackets 55 interact or engage with the hollow of the spa shell 12 to attach or anchor the selectively removable seatback 15 to the spa shell 12. In some embodiments, the bottom support brackets 55 together define the body 30. Alternatively, the bottom support brackets 55 together define a cavity to receive the body 30. The body 30 houses and receives the induction receiving coils 32.

Figure 5A:
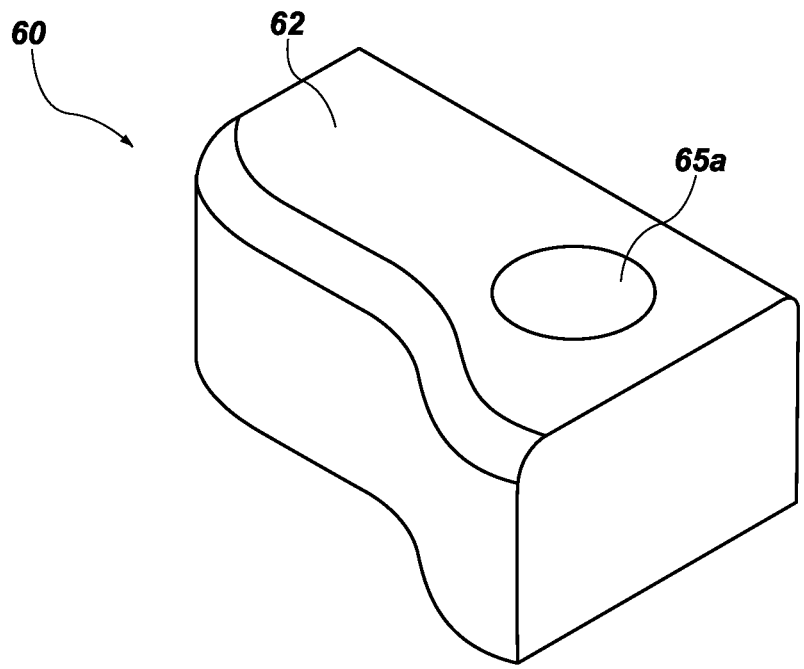
FIGS. 5A and 5B provide perspective views of induction coils disposed within a spa according to the present disclosure.
Figure 5B:
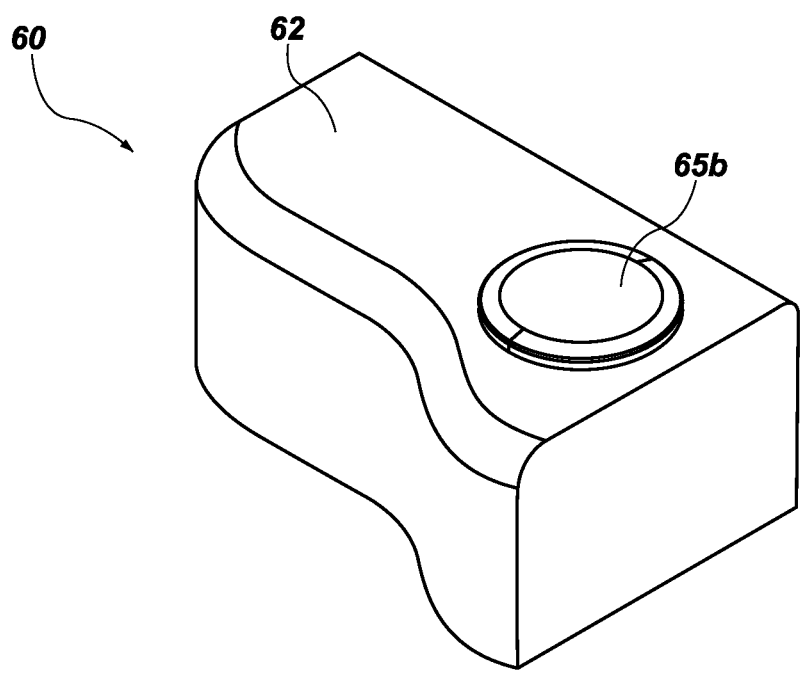

FIGS. 5A and 5B provide perspective views of induction coils disposed within a spa shell according to the present disclosure. As illustrated in FIG. 5A, the induction coils or induction plates 65a can be disposed just under a top surface 62 of a spa shell 60. In some embodiments, the spa shell 60 is constructed from an acrylic material, and the induction coils 65a are disposed just under the acrylic shell. In some embodiments, the shell 60 has a thickness of approximately 0.6 to 2 centimeters (cm), such as 0.7, 0.8, 0.9, 1.0, 1.5, 1.75, 1.8 cm or a thickness withing a range defined by any two of the foregoing values (e.g., approximately 0.25 to 0.75 inches, such as 0.3, 0.4, 0.5, 0.6 inches or a thickness within a range defined by any two of the foregoing values). In some embodiments, the induction coils 65a are induction transmitting coils, and are configured to generate and transmit an induction signal to be received by induction receiving coils. The induction coils 65a are configured to generate a sufficiently strong induction signal such that the induction signal can be transmitted through the thickness of the spa shell 60 and received by receiving coils.

For example, as shown in FIG. 5B, induction receiving coils 65b can be disposed or otherwise arranged on the top surface 62 of the spa shell 60. The induction receiving coils 65b can be disposed in an area of the top surface 62 that substantially corresponds to or aligns with the placement of the induction coils 65a under the top surface 62 of the spa shell 60. The induction receiving coils 65b can be configured to receive an induction signal generated and transmitted by the induction coils 65a. The induction receiving coils 65b can also be configured to use or transmit the received induction signal to power an accessory.

Figure 6A:
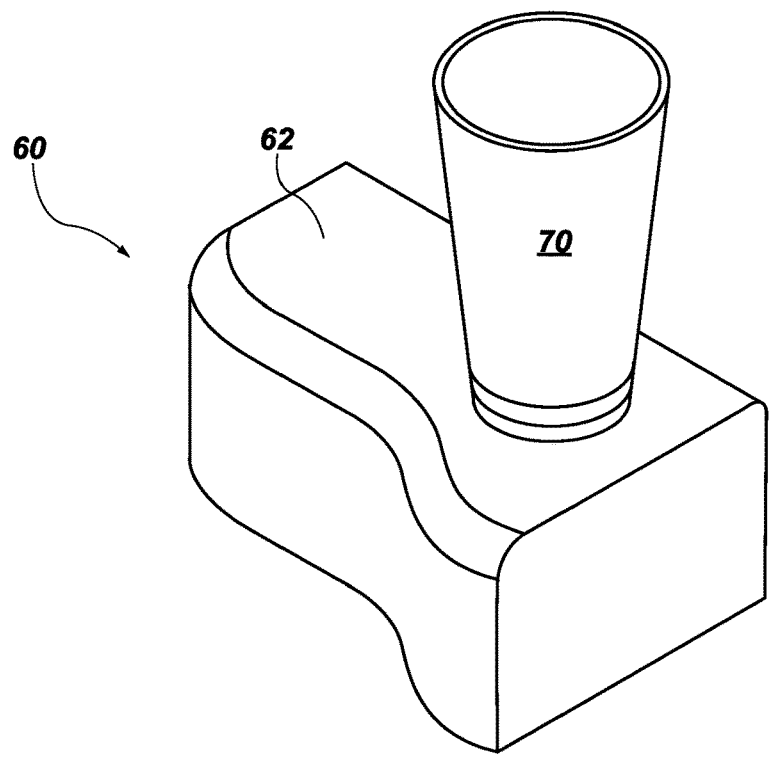
FIGS. 6A and 6B provide perspective views of induction coils disposed within a spa according to the present disclosure.
Figure 6B:
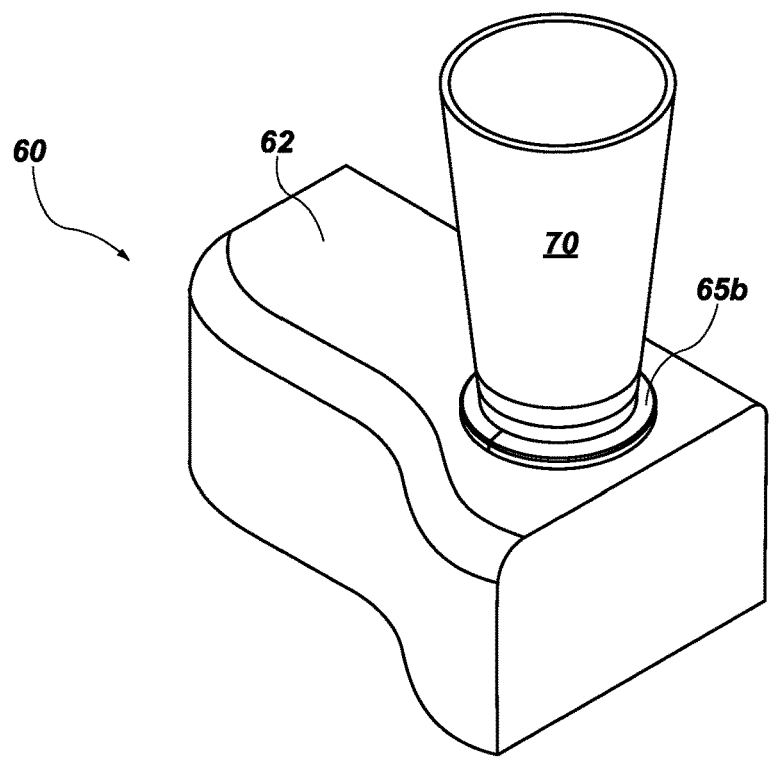

FIGS. 6A and 6B provide perspective views of an accessory in use with the induction coils of FIGS. 5A and 5B. As illustrated in FIGS. 6A and 6B, an accessory 70, such as a cup, can be placed on the top surface 62 of the spa shell 60. The accessory 70 is placed on the top surface 62 over the induction receiving coils 65b (the induction transmitting coils 65a have been omitted for clarity). As outlined, placement of the induction receiving coils 65b substantially aligns with placement of the induction transmitting coils 65a. The induction receiving coils 65b can be used to provide power to the accessory 70.

In some embodiments, the induction receiving coils 65b are disposed within the accessory 70, such as within a bottom of a cup. Placement of the accessory 70 on the top surface 62 of the shell 60 allows the induction receiving coils 65b to interface and be in electrical communication with the induction transmitting coils 65a. In some embodiments, the accessory 70 also includes lights or other components to be powered by the induction signal received by the induction receiving coils 65b. The top surface 62 can include a cup holder and the induction transmitting coils 65a can be placed at the bottom of the cup holder, just under the top surface 62.

Also disclosed are methods of providing wireless transmission of electricity. For example, in some embodiments, disclosed are methods of providing wireless transmission of electricity to spa components such as lights, cup holders, candles, or other components that may be incorporated into a spa. Methods of providing wireless transmission of electricity are known, such as the method described in U.S. Pat. No. 9,887,588, which is incorporated herein by reference in its entirety.

Figure 7:
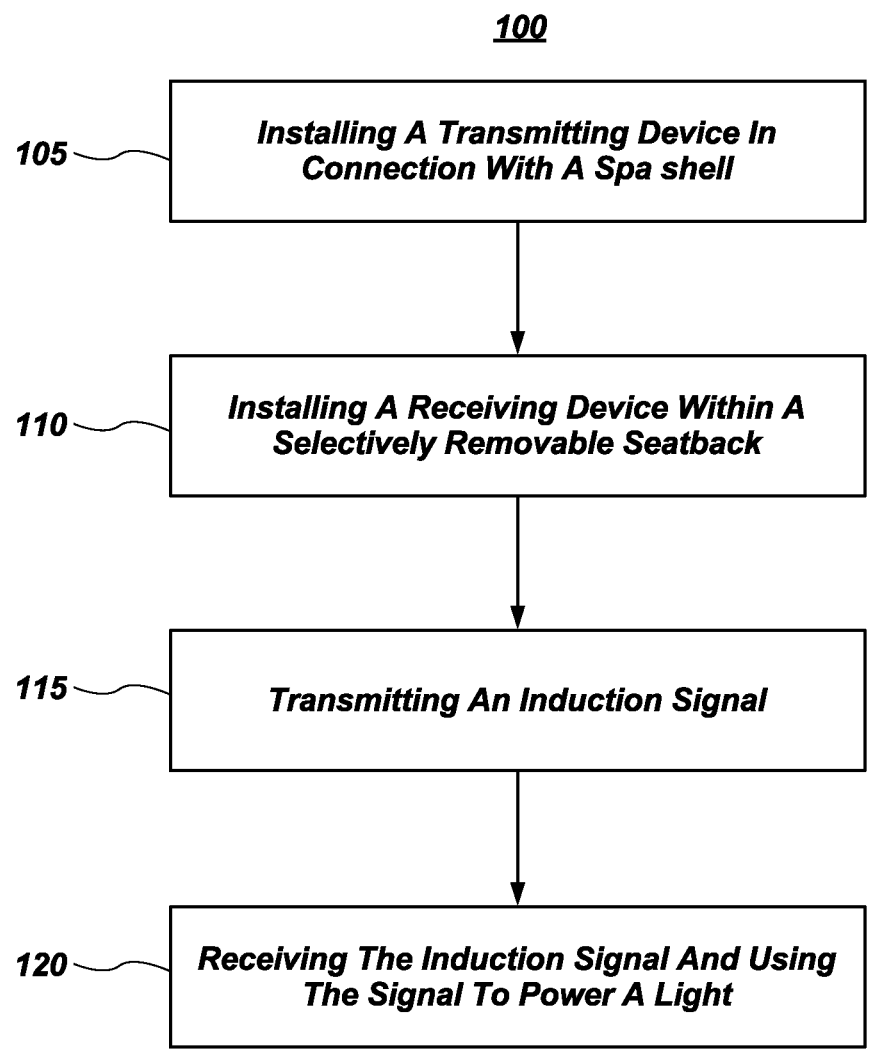
FIGS. 7 and 8 illustrate flowcharts of embodiments of methods according to the present disclosure.
Figure 8:
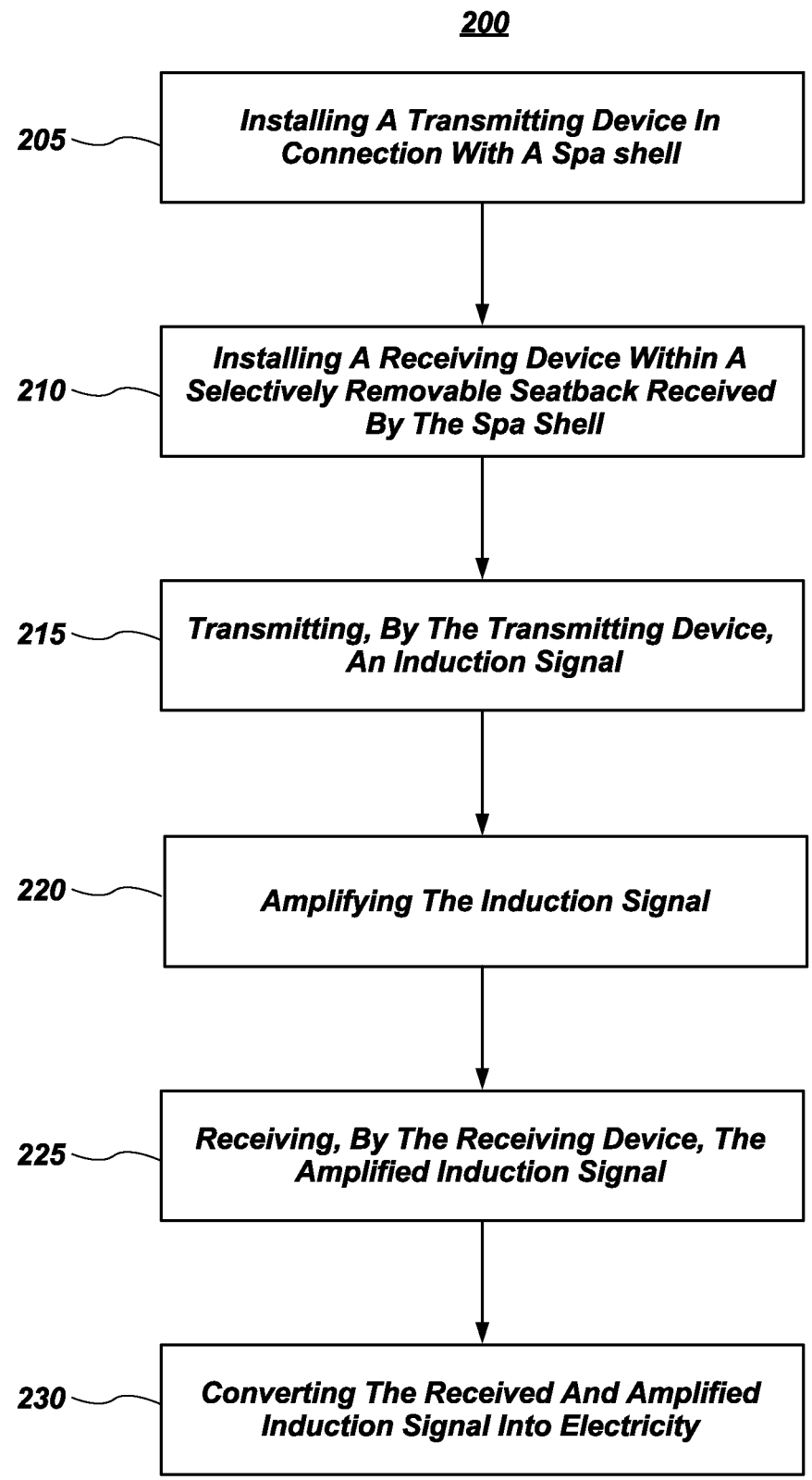

FIGS. 7 and 8 illustrate flowcharts of example methods for providing wireless transmission of electricity. Specifically illustrated are methods for providing wireless transmission of electricity to a spa accessory, such as a light incorporated into a spa. FIG. 7 illustrates a method 100 for providing wireless transmission of electricity to a light. In some embodiments, the method 100 includes installing a transmitting device in connection with a spa shell, at 105. As described, the transmitting device can be disposed within a port defined by the spa shell. The method 100 can also include installing a receiving device within a selectively removable seatback, at 110. As described, the receiving device can be housed or otherwise connected to a manifold of the selectively removable seatback. In some embodiments, the transmitting and receiving devices are installed such that they interface with each other.

The method 100 further includes transmitting an induction signal, at 115. For example, the transmitting device can generate and transmit the induction signal. The method 100 includes, at 120, receiving the induction signal and using the induction signal to power a light. For example, the induction signal can be received by the receiving device and subsequently transmitted or transferred to the light.

FIG. 8 illustrates a method 200 for providing wireless transmission of electricity to a light. In some embodiments, the method 200 includes installing a transmitting device in connection with a spa shell, at 205. As described, the transmitting device can be disposed within a port defined by the spa shell. The method 200 can also include installing a receiving device within a selectively removable seatback that is received by the spa shell, at 210. As described, the selectively removable seatback can be disposed within a hollow defined by an interior surface of the spa shell. Further, the receiving device can be housed or otherwise connected to a manifold of the selectively removable seatback. In some embodiments, the transmitting and receiving devices are installed such that they interface with each other. For example, a portion of the transmitting device may extend from a port in an exterior of the spa shell through a portion of the hollow, thereby allowing the transmitting device to interface with the receiving device.

The method 200 further includes transmitting an induction signal, at 215. For example, the transmitting device can generate and transmit the induction signal. The method 200 includes, at 220, amplifying the induction signal. As described with respect to FIG. 10 below, the induction signal can be amplified by an amplifier. The method 200 further includes receiving the amplified induction signal, at 225. For example, the receiving device will receive the amplified induction signal subsequent to amplification of the induction signal. The method 200 additionally includes converting the received and amplified induction signal into electricity, at 230. The converted electricity can then be used to power a light. For example, the amplified induction signal can be received by the receiving device, converted from an electromagnetic wave to an electrical current, where the electrical current is subsequently transmitted or transferred to the light.

Figure 9:
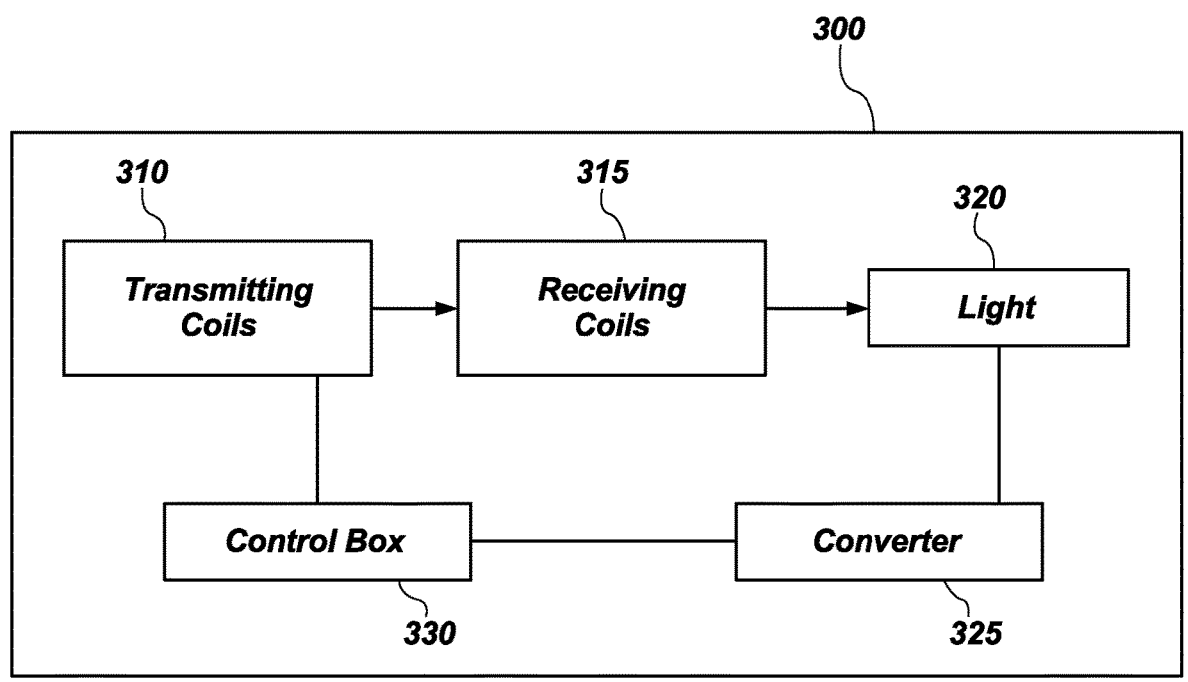
FIGS. 9 through 11 provide schematic block diagrams of an induction lighting system according to the present disclosure.

FIG. 9 provides a schematic block diagram of one example of an architecture for wirelessly transmitting electricity to a device, such as a light, according to the present disclosure. As illustrated, the architecture 300 includes at least one transmitting coil 310, at least one receiving coil 315, and at least one light 320. The at least one transmitting coil 310 is in communication (e.g., electrical communication) with the at least one receiving coil 315, and the at least one receiving coil 315 is in communication (e.g., electrical communication) with the at least one light 320. The architecture 300 can also include a converter 325 in communication with the light 320, and a control box 330 in communication with both the at least one transmitting coil 310 and the converter 325. In some embodiments, the control box 330 is the control box/power supply for the spa. In other words, the control box 330 may provide power to other components of the spa, such as pumps, filters, jets, other lights incorporated into the spa, etc.

In some embodiments, the converter 325 is configured to adjust at least one lighting characteristic of the light 320. For example, the converter 325 can be configured to adjust at least a brightness or intensity, color, and/or lighting pattern of the light 320. A lighting pattern can include, for example, pulsed output of the light 320. In some embodiments, the converter 325 can be configured to match a pulsed output of the light 320 to, for example, a rhythm or beat of music.

When a user interchanges a selectively removable seatback (see the selectively removable seatback 15 illustrated in FIGS. 1-3), the converter 325 is configured to adjust at least one characteristic of the light 320 such that the overall lighting characteristics for the spa are uniform. For example, in an embodiment, the overall lighting color within the spa is set to a constant blue. When the user interchanges a first selectively removable seatback for a second selectively removable seatback, the converter 325 will adjust the light 320 of the second selectively removable seatback to output a constant blue. In this way, the overall lighting characteristics for the spa can be maintained without interruption from the interchange of the selectively removable seatbacks.

Figure 10:
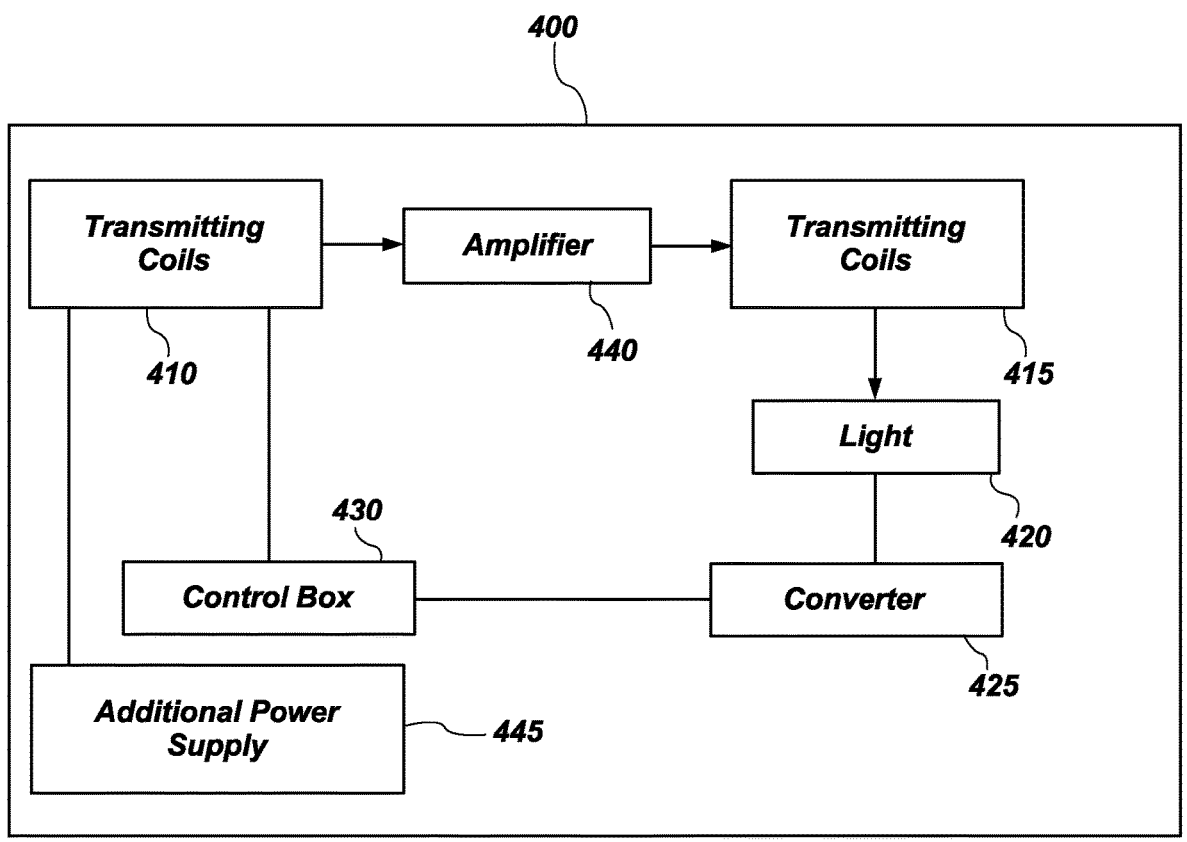

FIG. 10 provides a schematic block diagram of another example of an architecture according to the present disclosure. As illustrated, the architecture 400 includes at least one transmitting coil 410, at least one amplifier 440, at least one receiving coil 415, and a plurality of lights 420. The at least one transmitting coil 410 is in communication (e.g., electrical communication) with the at least one amplifier 440; the at least one amplifier 440 is in communication with at least one receiving coil 415; and the at least one receiving coil 415 is in communication (e.g., electrical communication) with the plurality of lights 420.

In some embodiments, the at least one amplifier 440 is configured to receive an induction signal generated and transmitted by the at least one transmitting coil 410. In some embodiments, the at least one amplifier 440 is further configured to amplify the received induction signal and transmit the amplified induction signal to the at least one receiving coil 415.

The architecture 400 can also include a converter 425 in communication with the plurality of lights 420, and a control box 430 in communication with both the at least one transmitting coil 410 and the converter 425. In some embodiments, the control box 430 is the control box/power supply for the spa. In other words, the control box 430 may provide power to other components of the spa, such as pumps, filters, jets, other lights incorporated into the spa, etc.

Similar to the architecture 300 of FIG. 9, in some embodiments, the converter 425 is configured to adjust at least one characteristic of the plurality of lights 420. For example, the converter 425 can be configured to adjust at least a brightness or intensity, color, and/or lighting pattern of the plurality of lights 420. A lighting pattern can include, for example, pulsed output of the plurality of lights 420. In some embodiments, the converter 425 can be configured to match or correspond a pulsed output of the plurality of lights 420 to, for example, a rhythm or beat of music.

When a user interchanges a selectively removable seatback (see the selectively removable seatback 15 illustrated in FIGS. 1-3), the converter 425 is configured to adjust at least one lighting characteristic of the plurality of lights 420 such that the overall lighting characteristics for the spa are uniform. In some embodiments, the at least one lighting characteristic includes a brightness or intensity, color, and/or lighting pattern. For example, in an embodiment, the overall lighting color within the spa is set to a constant blue. When the user interchanges a first selectively removable seatback for a second selectively removable seatback, the converter 425 will adjust the plurality of lights 420 of the second selectively removable seatback to output a constant blue. In this way, the overall lighting characteristics for the spa can be maintained without interruption from the interchange of the selectively removable seatbacks.

As illustrated, the architecture 400 also includes an additional power supply 445 in electrical communication with the at least one transmitting coil 410. In some embodiments, the control box 430 is configured to provide a first amperage and the additional power supply 445 is configured to provide a second amperage, which is greater than the first amperage. When the number of lights included in the plurality of lights 420 satisfies a threshold value, the at least one transmitting coil 410 can receive power from the additional power supply 445 instead of the control box 430. Specifically, when the plurality of lights 420 require an amperage that exceeds the first amperage of the control box 430, the additional power supply 445 can be used to provide power and/or amperage to the at least one transmitting coil 410 and, thus, the plurality of lights 420.

Figure 11:
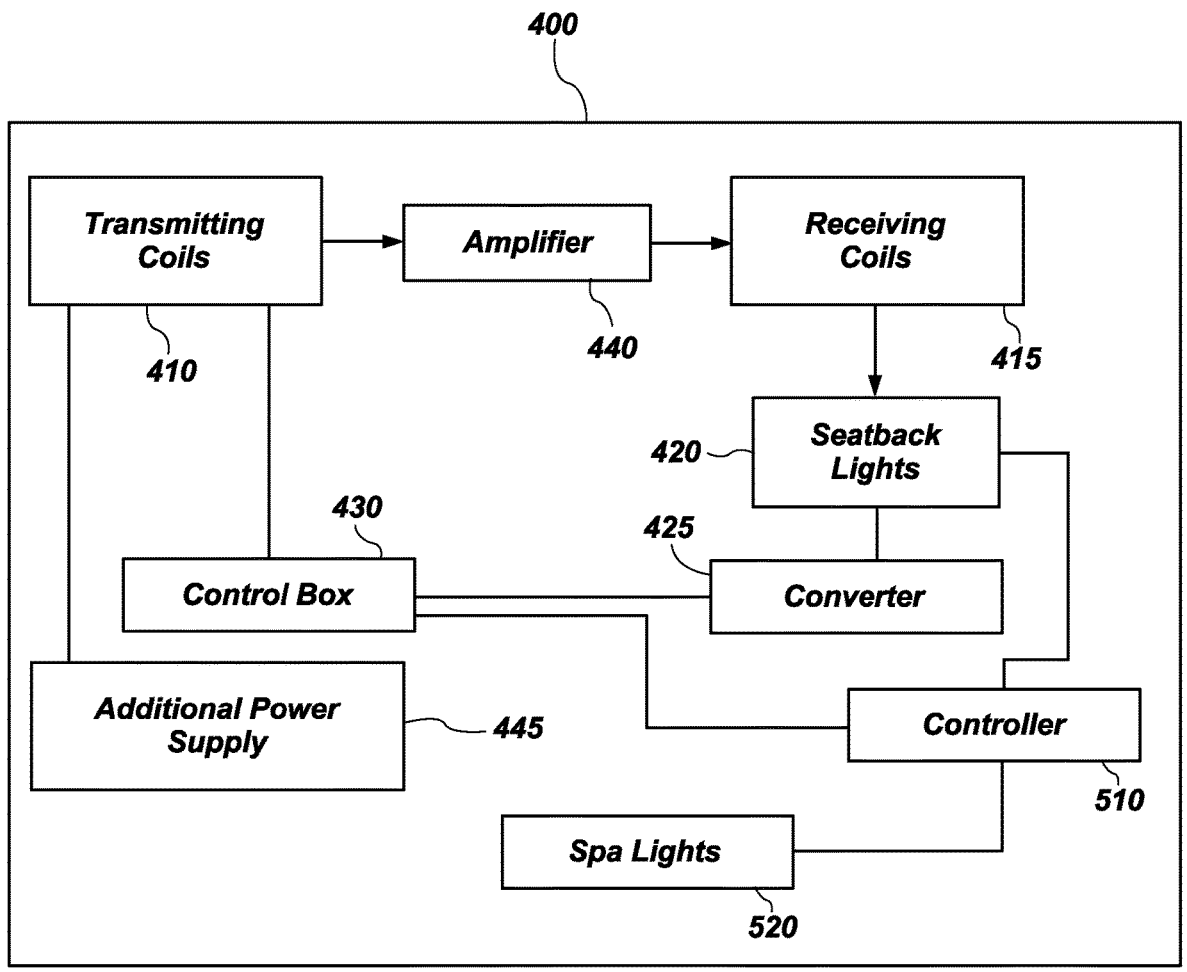

FIG. 11 provides a schematic block diagram of another embodiment of the architecture 400 illustrated in FIG. 10. Thus, like elements will be labelled with like reference numbers. As illustrated in FIG. 11, the architecture 400 includes at least one transmitting coil 410, at least one amplifier 440, at least one receiving coil 415, at least one spa seatback light 420, and a plurality of spa lights 520. The plurality of spa lights 520 are installed and/or disposed in connection with the spa shell. The at least one transmitting coil 410 is in communication (e.g., electrical communication) with the at least one amplifier 440; the at least one amplifier 440 is in communication with at least one receiving coil 415; and the at least one receiving coil 415 is in communication (e.g., electrical communication) with the at least one spa seatback light 420.

Similar to the architecture 300 and 400 of FIGS. 9 and 10, in some embodiments, the converter 425 is configured to adjust at least one characteristic of both the at least one spa seatback light 420 and the plurality of spa lights 520. In some embodiments, the converter 425 is configured to adjust the lighting characteristic(s) for both lights 420, 520 simultaneously. In some embodiments, the converter 425 is configured to adjust the lighting characteristic(s) for both lights 420, 520 asynchronously. For example, the converter 425 can be configured to adjust at least a brightness or intensity, color, and/or lighting pattern of the at least one spa seatback light 420 and/or the plurality of spa lights 520. A lighting pattern can include, for example, a pulsed output of the lights 420, 520. In some embodiments, the converter 425 can be configured to match or correspond the pulsed output of the lights 420, 520 to, for example, a rhythm or beat of music.

In some embodiments, the control box 430 is also configured to control and/or adjust at least one characteristic of both the at least one spa seatback light 420 and the plurality of spa lights 520. In some embodiments, the control box 430 and the converter 425 both control and/or adjust at least one characteristic of the at least one spa seatback light 420 and/or the plurality of spa lights 520.

The architecture 400 illustrated in FIG. 11 additionally includes a controller 510. In some embodiments, the controller 510 is in communication (e.g., electrical communication) with the at least one spa seatback light 420, the plurality of spa lights 520, and the control box 430. Additionally, and/or alternatively, the controller 510 is in communication (e.g., electrical communication) with the additional power supply 445.

In some embodiments, the controller 510 can be configured to control at least one lighting characteristic for the at least one spa seatback light 420 and/or the plurality of spa lights 520. As before, the at least one lighting characteristic can include, at least, a brightness or intensity, color, and/or a lighting pattern. In some embodiments, the controller 510 controls the at least one lighting characteristic for both lights 420, 520 simultaneously or substantially simultaneously. In some embodiments, the controller 510 controls the at least one lighting characteristic for both lights 420, 520 asynchronously. Though not illustrated, in some embodiments, the architecture 400 includes a user interface in communication with the controller 510. The user interface can allow a user to select at least one setting corresponding to the lighting characteristics for the at least one spa seatback light 420 and/or the plurality of spa lights 520.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It should also be noted that some of the embodiments disclosed herein may have been disclosed in relation to a particular water-containing vessel (e.g., a spa); however, other vessels (e.g., pools, tubs, swim spas, etc.) are also contemplated. A spa is also known in the industry as a hot tub and is generally formed of a concave shell to receive and contain water. Structures, such as a jet, can extend through the concave shell to move water from a surface outside the spa to a surface inside the spa or shell. Surfaces inside the shell are referred to as more "proximal" while surfaces that extend through the shell are referred to as "distal." A proximal side of the spa shell faces the portion of the spa shell where the user relaxes. Electrical communication means direct wired electrical communication, wireless electrical communication, induction communication, magnetic communication, etc.

In one embodiment, the terms "about" and "approximately" refer to numerical parameters within 10% of the indicated range. The terms "a," "an," "the," and similar referents used in the context of describing the embodiments of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the author(s) of this disclosure for carrying out the embodiments disclosed herein. Of course, variations on these described embodiments will become apparent to those of ordinary skill in the art upon reading the foregoing description. The author(s) expects skilled artisans to employ such variations as appropriate, and the author(s) intends for the embodiments of the present disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of this disclosure so claimed are inherently or expressly described and enabled herein.

Although this disclosure provides many specifics, these should not be construed as limiting the scope of any of the claims that follow, but merely as providing illustrations of some embodiments of elements and features of the disclosed subject matter. Other embodiments of the disclosed subject matter, and of their elements and features, may be devised which do not depart from the spirit or scope of any of the claims. Features from different embodiments may be employed in combination. Accordingly, the scope of each claim is limited only by its plain language and the legal equivalents thereto.

What is claimed:

1. A system for wirelessly transmitting electricity to a light in a selectively removable spa seatback, the system comprising:
   a selectively removable spa seatback;
   at least one transmitting device in connection with a spa shell;
   a receiving device housed within the selectively removable spa seatback, wherein the receiving device is in electrical communication with the at least one the transmitting device;
   a light within the selectively removable spa seatback, wherein the light is in electrical communication with the receiving device; and
   a converter in electrical communication with the light and a control box of a spa.

2. The system of claim 1, further comprising an amplifier configured to receive and amplify an induction signal from the transmitting device to generate an amplified induction signal.

3. The system of claim 2, wherein the at least one transmitting device comprises a first and a second transmitting device, and the receiving device housed within the selectively removable spa seatback interfaces with the first transmitting device.

4. The system of claim 3 further comprising a second receiving device in connection with the spa shell and in electrical communication with the second transmitting device.

5. The system of claim 2, wherein the amplifier is further configured to send the amplified induction signal to the receiving device.

6. The system of claim 1, wherein the selectively removable spa seatback is received by a cavity defined by an interior of the spa shell.

7. The system of claim 6, wherein the transmitting device is disposed within the cavity.

8. The system of claim 1, wherein the transmitting device is disposed between the selectively removable spa seatback and the spa shell.

9. The system of claim 1, wherein the transmitting device abuts the receiving device when the selectively removable spa seatback is in an installed position.

10. A lighting system for a spa, the lighting system comprising:
    a plurality of lights, wherein at least one first light of the plurality of lights is housed within a selectively removable seatback and at least one second light of the plurality of lights is installed in connection with a spa shell;
    a transmitting device installed in connection with the spa shell;
    a receiving device housed within the selectively removable seatback and in electrical communication with the at least one first light; and
    a controller in electrical communication with the at least one first light and the at least one second light, wherein the controller is configured to control at least one lighting characteristic of the at least one first light and the at least one second light.

11. The lighting system of claim 10, wherein the selectively removable seatback is received by a hollow defined by the spa shell.

12. The lighting system of claim 10, wherein the transmitting device abuts the receiving device when the selectively removable seatback is in an installed position.

13. The lighting system of claim 10, wherein the at least one lighting characteristic comprises a brightness or intensity, color, and/or lighting pattern.

14. The lighting system of claim 10, further comprising a control box in communication with the transmitting device and/or the controller.

\* \* \* \* \*